Patented June 5, 1923.

1,457,934

UNITED STATES PATENT OFFICE.

JAMES B. PIERCE, JR., OF CHARLESTON, WEST VIRGINIA.

METHOD OF MAKING PRECIPITATED BARIUM SULPHATE AND SODIUM SULPHYDRATE.

No Drawing.   Application filed October 8, 1921.   Serial No. 506,336.

*To all whom it may concern:*

Be it known that I, JAMES B. PIERCE, Jr., a citizen of the United States, and a resident of Charleston, in the county of Kanawha and State of West Virginia, have invented new and useful Improvements in Methods of Making Precipitated Barium Sulphate and Sodium Sulphydrate, of which the following is a specification.

This invention relates to the production of precipitated barium sulphate, commonly termed blanc fixe, and also sodium sulphate and sodium sulphydrate as by-products and has for its particular objects the expeditious and economical production of these compounds relatively free from iron and other impurities.

In the manufacture of high grade precipitated barium sulphate or blanc fixe by the interaction of solutions of barium sulphide and sodium sulphate, it is necessary that both solutions of barium sulphide and sodium sulphate be practically pure, except that they may contain small amounts of sodium sulphide, which is not objectionable since it is also formed as a co-product with the precipitated barium sulphate or blanc fixe in the reaction itself. Owing to its purity, a water solution of crude barium sulphide is, however, suitable for this purpose.

Heretofore, the source of sodium sulphate most commonly employed has been salt cake, but on account of its high cost some cheaper source would be preferable. Niter cake, costing only a fraction the amount of salt cake, would be ideal for this purpose if an economical way of turning the acid content thereof (about 30% sulphuric acid $H_2SO_4$), into sodium sulphate ($Na_2SO_4$) and the subsequent removal of impurities, iron, alumina, lime and magnesia, could be found. It has been proposed for this neutralization, to employ soda ash or some of its modifications or even sodium sulphide, but owing to the high cost of these sodium compounds, such employment of niter cake resulted in little or no saving. In the case of sodium sulphide there was the added disadvantage of the evolution of large quantities of poisonous hydrogen sulphide gas. It can readily be appreciated, however, that as sodium sulphide is a co-product from the precipitation reaction, a very advantageous situation would result if some use for the hydrogen sulphide gas could be developed which would accomplish the two ends desired, i. e., remove the gas, thus rendering its poisonous properties harmless, and place a value upon the gas which would off-set the value of the sodium sulphide.

My investigations have led to the discovery that not only can the hydrogen sulphide gas be economically utilized by the production of sodium sulphydrate, but that the products, barium sulphate, sodium sulphate and the aforesaid sodium sulphydrate can be readily obtained in a high degree of purity by a very simple and expeditious procedure which requires only sulphide and niter cake for the production of such product.

In carrying out my invention, I preferably proceed as follows:

Chemically equivalent, i. e. combining weights, of sodium sulphide and niter cake, ($NaHSO_4$) are caused to react, thereby forming the products of hydrogen sulphide and sodium sulphate (Glauber's salt). The hydrogen sulphide so obtained is then caused to react with a solution of sodium sulphide, obtained in the customary manner from the above described process commonly employed for making barium sulphate. The said interaction between the sodium sulphide and the hydrogen sulphide which is absorbed thereby results in the production of sodium sulphydrate.

The equations corresponding to the above reactions may be represented as follows:

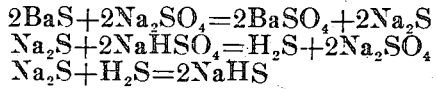

In addition to the above described advantages of my improvement is the fact that the same constitutes virtually a closed or cyclic process which requires only barium sulphide and niter cake for the production of high grade precipitated barium sulphate and sodium sulphydrate, both of which products are marketable in enormous quantities. Furthermore the neutralization of the acid, iron-bearing niter cake by the alkaline sodium sulphide results in the formation of sodium sulphate as a soluble product and iron sulphide FeS as a precipitate which can be readily filtered therefrom. As a consequence the iron is very completely and readily removed and the final products produced are of high purity.

Without departing from the spirit of my invention, various modifications, within the scope of the appended claims, may be made in the within procedure.

The precipitated barium sulphate and the sodium sulphydrate are separated and purified by washing in the former case and recrystallization in the latter case in the well known manner.

In my co-pending application Serial No. 506,337 filed of even date herewith I have described and claimed the method of improving the character of the barium sulphate by controlling the temperature of the solutions and the temperature and purity of wash water, as well as the control of the concentration of the interacting barium sulphide and sodium sulphate solutions and accordingly do not claim such control methods in this application.

Having thus described my invention, what I claim and desire to secure by Letters Patent of the United States is:

1. The cyclic method of making precipitated barium sulphate and sodium sulphydrate, which consists in effecting double decomposition between solutions of barium sulphide and sodium sulphate, neutralizing niter cake with sodium sulphide formed by the said reaction, causing the resultant hydrogen sulphide gas to react with a sufficient quantity of sodium sulphide to substantially completely absorb the said gas and form sodium sulphydrate and causing the sodium sulphate produced from the said reaction of the sodium sulphide and niter cake to react with a fresh portion of barium sulphide.

2. The method of making precipitated barium sulphate and sodium sulphydrate, which consists in effecting the double decomposition of barium sulphide and sodium sulphate, effecting the substantial neutralization of acid sodium sulphate with at least a portion of the resultant sodium sulphide and absorbing the resultant hydrogen sulphide in another portion of sodium sulphide obtained from the first reaction aforesaid.

Signed at Charleston, in the county of Kanawha and State of West Virginia, this 23rd day of September, 1921.

JAMES B. PIERCE, Jr.